A. C. KREBS.
CLUTCH AND GEAR SHIFTER.
APPLICATION FILED JAN. 17, 1912.

1,112,810.

Patented Oct. 6, 1914.
2 SHEETS—SHEET 1.

WITNESSES:
John H. Loring
F. H. Logan

INVENTOR
ARTHUR C. KREBS
BY
ATTORNEYS.

A. C. KREBS.
CLUTCH AND GEAR SHIFTER.
APPLICATION FILED JAN. 17, 1912.
1,112,810.
Patented Oct. 6, 1914.
2 SHEETS—SHEET 2.
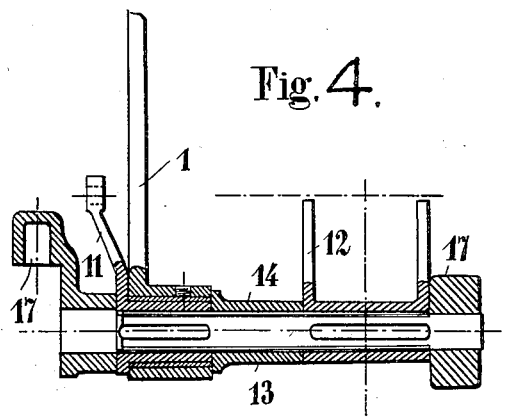
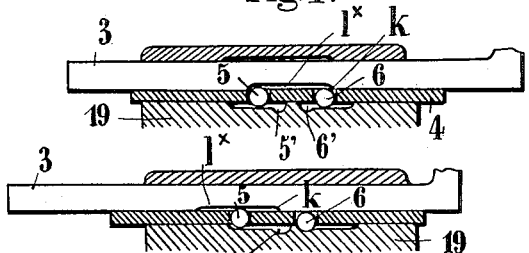
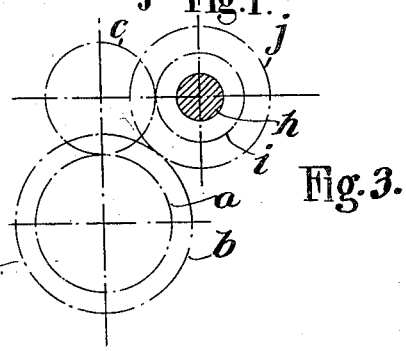
WITNESSES:
INVENTOR
ARTHUR C. KREBS
BY
ATTORNEYS.

UNITED STATES PATENT OFFICE.

ARTHUR CONSTANTIN KREBS, OF PARIS, FRANCE, ASSIGNOR TO SOCIÉTÉ ANONYME DES ANCIENS ETABLISSEMENTS PANHARD & LEVASSOR, OF PARIS, FRANCE.

CLUTCH AND GEAR SHIFTER.

1,112,810.      Specification of Letters Patent.      Patented Oct. 6, 1914.

Application filed January 17, 1912. Serial No. 671,754.

*To all whom it may concern:*

Be it known that I, ARTHUR CONSTANTIN KREBS, a citizen of the Republic of France, residing at Paris, France, have invented new and useful Improvements in Clutch and Gear Shifters, which are fully set forth in the following specification.

In mechanisms comprising a separate clutch and transmission gear, consisting of trains of gears capable of displacement for producing either reversing or change of gearing action, the controlling is generally effected by means of separate levers, one for the clutch and another for shifting the gear wheels.

The present invention has for its object to provide an arrangement by which the movement, in the same direction, of a single-hand lever effects the changing of the gear ratio, this movement successively uncoupling the motor clutch, shifting the gears and again coupling the motor-clutch.

To bring about this action the said single hand-lever acts upon a pair of toggle members, one of which members imparts to a freely swinging arm a reciprocating movement which uncouples and couples the clutch during a single movement of the hand lever.

The invention is especially applicable to vehicles and motor boats. The following description relates to its application to the reversal of direction of the propeller of a motor boat.

Figure 1:
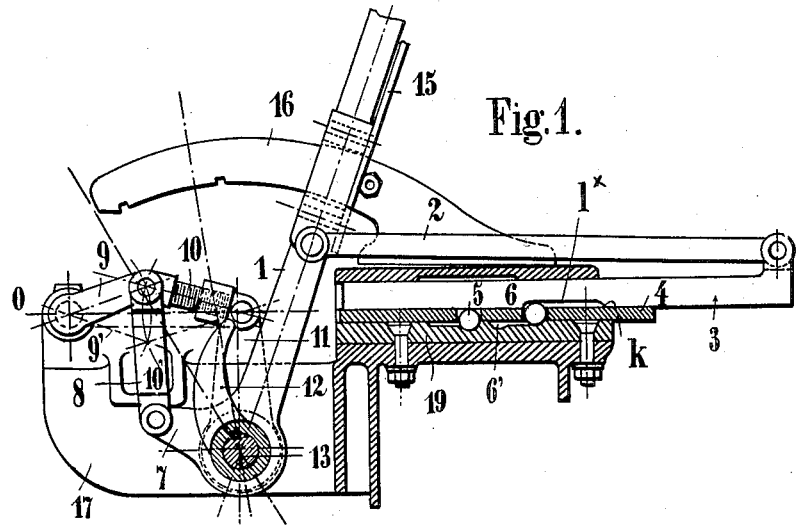
Figure 2:
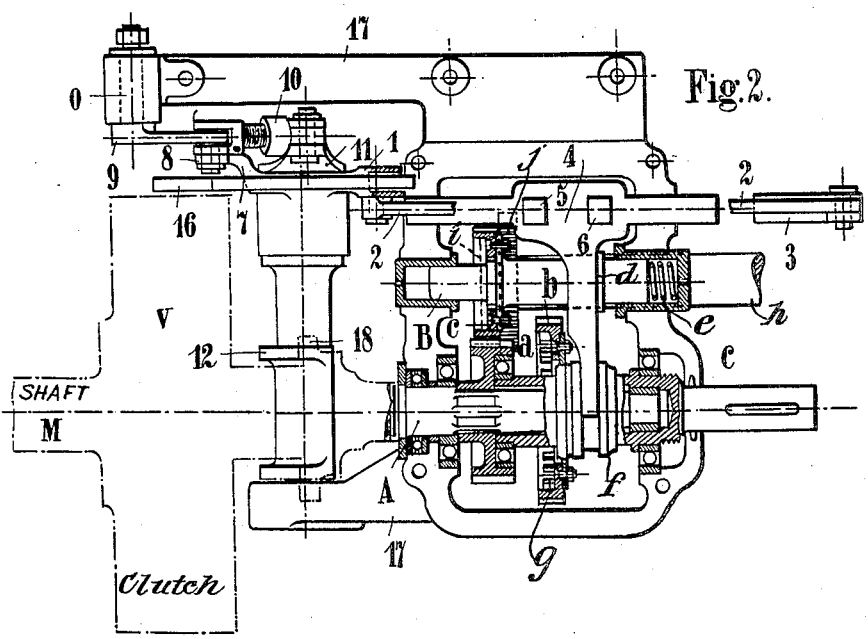

The form and arrangement of the various operating parts are illustrated, by way of example, in the accompanying drawing, in which, Figure 1 shows a longitudinal vertical section, partly in elevation, of the clutch and gear shifter; Figs. 1' and 1" show vertical sections, partly in elevation, of details in different relative positions of operations; Fig. 2 is a plan of the same partly in horizontal section, and parts being broken away; Fig. 3 is a diagrammatic end elevation of the gear shifter; and Fig. 4 shows a vertical section on the axis of the clutch fork.

The apparatus comprises two distinct mechanisms, the control for the clutch and the control for shifting the train of gears, the movements thereof being determined in such a manner that their operation is produced in succession.

The operating lever 1 provided with a bent prolongation 7 is mounted loose upon the sleeve of a lever 11 keyed upon the shaft 13 as shown in Fig. 4. By pushing the lever 1 forward, the lever 7 rotates around the shaft 13 and, by the intermediary of the connecting link 8, depresses the toggle joint formed by the parts 9 and 10; the pivot O of the part 9 being fixed, the part 10 will push backward the lever 11 wherewith it is jointed; the lever 11 in its rotation on the shaft 13 will carry along the unclutching fork 12 also keyed on the grooved shaft 13; the fork 12 which bears upon the collar 18 of the clutch gradually unclutches the shaft A, connected with the motor shaft M by means of a clutch of any suitable type. The lever 11 will reach its rear limit position when the parts 9 and 10 are in line; at that moment, as the lever 1 continues its course, the lever 11 and the fork 12 move forward again and at the end of that movement, when the toggle joint assumes the position shown at 9' and 10', the fork 12 will resume its original position and the shaft A will be again rigidly connected with the motor.

In order that the gears may always be shifted during the portion of the travel of the lever 1 corresponding to complete unclutching, the fork 4 (N. B. The fork 4 rests on a collar $d$ of the intermediate shaft B so as to displace the latter in a direction opposite to the action of the spiral spring $e$. The same fork 4 engages with its end the grooved collar $f$, integral with the sliding gear $b$), which serves to displace the sliding gear $b$, is connected with the lever 1 in the following manner: The rod 2 fixed to the lever 1 displaces the rod 3 which slides freely in its guides, without however displacing the fork 4 which is locked by the key 5 housed in a recess in the plate 19. When the lever 1 has described a certain angle corresponding to complete unclutching, the extremity K of the recess $1^x$ of the rod 3 has struck against the bolt 6; at the same time the recess $1^x$, the length of which has been suitably proportioned for that purpose, is located above the key 5 permitting the latter to leave its recess and to release the fork 4; consequently this fork which at that moment is rigid with the rod 3 by the intermediary of the bolt 6 moves forward carrying along with it the sliding gear $b$ at the same time as the spring $e$ pushes back the toothed pinion c, while the collar d of the intermediate shaft B remains resting against the fork 4.

Slightly before the lever 1 reaches its forward position and as soon as the clutching tends to take place, the key 6 enters the recess 6' in the plate 19, and locks the fork 4 and consequently the sliding gear b which has reached the desired position where it engages with the toothed pinion j carried by the shaft h and where at the same time it engages with the toothed pinion a by means of its interior toothed crown g. When this engagement takes place the gear c has already released the toothed pinion i carried by the shaft h. As the movement of the gear wheels is entirely finished, meshing will take place progressively, as indicated hereabove, by pushing the lever 1 to the end of its stroke; and the sliding gear b carried along by the motion of the shaft A will communicate directly to the shaft h, by means of the gear j, a movement in the opposite direction, the intermediary e having been removed. By operating the lever 1 from front to rear the same operations will be reproduced inversely.

What I claim and desire to secure by Letters Patent of the United States is:—

1. In a clutch and gear shifter, the combination of a clutch; a gear shifter; a toggle connected to the clutch and adapted to unclutch the clutch when the toggle is on the dead center and to clutch the clutch when the toggle is on either side of the dead center and means operatively connecting the toggle with the shifter.

2. In a clutch and gear shifter, the combination of a clutch; a gear shifter, a toggle connected to the clutch and adapted to unclutch the clutch when the toggle is on the dead center and to clutch the clutch when the toggle is on either side of the dead center and means operatively connecting the toggle with the shifter for constraining the toggle to move to the dead center whenever the gear is shifted.

3. In a clutch and gear shifter, the combination of a clutch; a gear shifter, a toggle connected to the clutch and adapted to unclutch the clutch when the toggle is on the dead center and to clutch the clutch when the toggle is on either side of the dead center; means operatively connecting the toggle with the shifter for constraining the toggle to move to the dead center whenever the gear is shifted and an operating lever connected to said means.

4. In a clutch gear shifter, the combination of a frame; an unclutching lever; an unclutching fork connected to the unclutching lever; a fulcrumed operating lever; a pair of toggle links having one free end pivoted to the frame and the other free end pivoted to the unclutching lever; a link connecting said extension to the toggle joint of the links; a gear shifter and an operative connection between the gear shifter and the operating lever.

5. In a clutch gear shifter, the combination of a frame; a shaft rotatable thereon; an unclutching lever and an unclutching fork fixed on said shaft; an operating lever loosely mounted on said shaft and provided with a bent extension; a pair of links pivoted together at their adjacent ends to form a toggle joint and having the outer end of one link pivoted to the frame and the outer end of the other link pivoted to said unclutching lever; a rod connecting the free end of the bent extension with the toggle joint of said links; a gear shifter; and an operative connection between the operating lever and the gear shifter.

6. In a clutch and gear shifter, the combination of a plate; a displacing member movable relative to the plate; an operating lever; an unclutching mechanism operatively connected to the operating lever; an operating member operatively connected to the operating lever and slidable relative to said displacing member and plate; and means adapted to engage said plate and members and to be engaged and moved by said members to cause said displacing member to be at times locked relative to the plate and at other times moved with the operating member.

7. In a clutch and gear shifter, the combination of a plate; a displacing member movable relative to the plate; an operating lever; an unclutching mechanism operatively connected to the operating lever; an operating member operatively connected to the operating lever and slidable relative to said displacing member and plate; and keys adapted to engage and to be engaged and moved by said plate and members to cause said displacing member to be at times locked relative to the plate and at other times moved with the operating member.

8. In a clutch and gear shifter, the combination of a plate having therein grooves provided with recesses; a displacing member movable relative to the plate and having openings therein; an operating lever; an unclutching mechanism operatively connected thereto; an operating member operatively connected to the operating lever, movable relatively to the displacing member and having a recess therein; and keys adapted to engage in said grooves, recesses and openings and adapted to be moved at times to lock the displacing member relative to the plate and at other times to cause the displacing member to move with the operating member.

9. In a clutch and gear shifter, the combination of a plate having therein a pair of alined grooves, each groove having a recess at the end adjacent to the other grooves; a displacing member guided over said grooves and having openings adapted to be simultaneously placed in register with the corresponding ends of the grooves respectively; a rod guided on the displacing member and provided with a recess adapted to cover both of said openings simultaneously; keys in said openings and adapted to engage in said recesses; an unclutching mechanism; and a lever operatively connected to the unclutching mechanism and said rod.

10. In a clutch and gear shifter, the combination of an unclutching mechanism; a pair of toggle links operatively connected at one end to the unclutching mechanism; an operating lever operatively connected to the toggle joint of said toggle links; a fixed plate having thereon a pair of alined grooves each having a recess at its inner end; a displacing member guided over said grooves and having openings adapted to be placed in register with corresponding ends of the grooves respectively; a rod operatively connected to the operating lever and guided on the displacing member and provided with an elongated recess adapted to cover both of said openings; keys in said openings and adapted at times to engage in said recesses.

11. In a clutch and gear shifter, the combination of a frame; an unclutching lever; an unclutching fork operatively connected to the unclutching lever; a fulcrumed operating lever having an extension thereon; a pair of toggle links having one free end pivoted to the frame and the other to the unclutching lever; a link connecting said extension with the toggle joint of said toggle links; a plate on said frame and having thereon a pair of alined grooves each having a recess at its inner end; a guide sleeve guided over said grooves and having openings adapted to be placed in register with the corresponding ends of said grooves respectively; a rod slidable in said guide sleeve and provided with an elongated recess adapted to simultaneously cover both of said openings; keys in said openings and adapted to engage in said recesses; a gear displacing fork on said guide sleeve; and a link connecting the operating lever with said rod.

12. In a clutch and gear shifter, the combination of a frame; a sleeve rotatable thereon; an unclutching lever and an unclutching fork fixed to said sleeve; an operating lever loosely mounted on said sleeve and provided with a bent extension; a pair of links pivoted together at their inner ends to form a toggle joint and having the outer end of one pivoted to the frame and the outer end of the other pivoted to the free end of the unclutching lever; a rod connecting the free end of said extension with the toggle joint of said links; a plate on said frame and having thereon a pair of alined grooves having recesses at their inner ends; a guide sleeve guided over said grooves and having a pair of openings in register with said grooves respectively; a rod slidable in said guide sleeve and provided with a recess adapted to cover either one or both of said openings; keys in said openings and adapted to engage in said recesses; a link connecting the operating lever with the last named rod; and a gear displacing fork on said guide sleeve.

In testimony whereof I have signed this specification in the presence of two subscribing witnesses.

ARTHUR CONSTANTIN KREBS.

Witnesses:
EMILE LEDRET,
H. C. COXE.